United States Patent [19]

Fishgal

[11] Patent Number: 4,625,923

[45] Date of Patent: Dec. 2, 1986

[54] CONTAMINANTS FILTERING AND BREAKING

[76] Inventor: Semyon Fishgal, 1908-35 High Park Ave., Toronto, Canada, M6P 2R6

[21] Appl. No.: 750,771

[22] Filed: Jul. 1, 1985

[51] Int. Cl.$^4$ .............................................. B02C 19/06
[52] U.S. Cl. .................................... 241/40; 184/6.21; 241/5; 241/30
[58] Field of Search ................ 137/14; 184/6.21, 6.24; 310/90, 89, 40 R; 241/5, 39, 40, 301

[56] References Cited

U.S. PATENT DOCUMENTS 4,140,281  2/1979  Fulghum, Jr. et al. ............... 241/40
4,284,245  8/1981  Fishgal ................................. 241/40

Primary Examiner—Howard N. Goldberg
Assistant Examiner—Timothy V. Eley

[57] ABSTRACT

A nozzle with a stand-off plate is incorporated in a filter to remove and break-down contaminants existing within a liquid medium, said filter being represented by a collar with a plurality of minor openings or by a spring.

8 Claims, 3 Drawing Figures

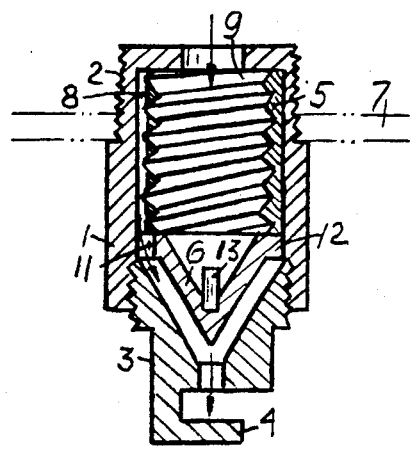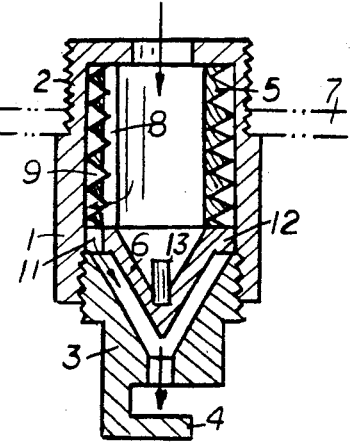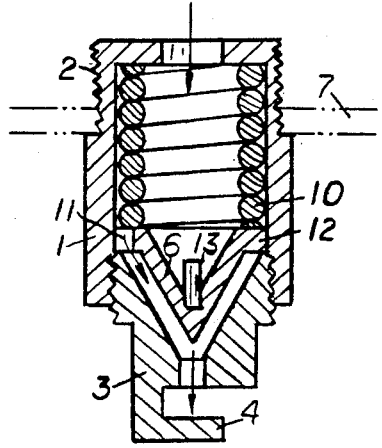

CONTAMINANTS FILTERING AND BREAKING

This invention relates to devices for treating a liquid medium in lubrication, hydraulic, fuel-feed and the like systems, particularly those contaminated unavoidably in operation.

The importance of said treatment is shown, for example, in the present inventor's U.S. Pat. Nos. 4,173,983; 4,271,929; 4,279,751; 4,284,245 and 4,372,491.

To a great extent, the reliability and working life of the medium, the systems and their machines depend on the working properties of the liquids used. These properties are determined by the presence of solid, liquid and gaseous contaminants in the liquid, state of their dispersion and fineness. It is known, for instance, that 75% of all hydraulic systems failures are caused by the contaminants.

The solid contaminants (burrs, chips, flash, dirt, dust, fibre, sand, moisture, sealant, weld splatter, paints and flushing solutions) are products of machining, wear, oxidation of the details (bearings, seals, gears, etc.), decomposition and oxidation of the fluid, or dust from the environment.

In many cases the environmental contamination depends on fluid volume oscillations in the liquid tanks "breathing" in operation, for example, because of the strokes of hydraulic cylinders and accumulators or temperature fluctuations. Also, dust deposits on the rods of the cylinders.

The solid contaminants are abrasive, plough and cut fragments from surfaces, cause wear, decrease the term of the unit service, wedge moving details and lead to inoperativeness of automatic controls due to silting or unproper valves sitting. This is most critical, for instance, in numerically controlled machinery, where servovalves are used to control the fluid flow. The valve clearances are so close that their function is seriously impeded by the dirty fluid.

As much as to hydraulic systems, this is true for fuel-feed systems, particularly in gas turbines of road vehicles, with the parts many times smaller than those of aircraft systems and the openings susceptible to blockage through dirt ingress and carbon deposit formation.

In power shift transmissions, a common failure of bearings, clutches, raceways and seal rings is surface fatigue or spalling. A switch from a 40 micron filter to that of 12 microns doubles the bearings life, the switch to 3 microns extending the life to 5-6 times.

Gaseous contaminants (air, carbon dioxide, sulphur dioxide, water vapor, fuel vapor) are absorbed from the environment due to the temperature "breathing" or from the internal source (such as incomplete combustion).

Unsolved gases deteriorate pliability, triggering and stability of the systems and cause their inoperativeness. Some gases (e.g. sulphur dioxide) form acids with water, resulting in corrosion, gummy and sticky sludges filling the pores of employed filters (which can be by-passed by the flow and be thus ineffective). Since oxygen solubility is higher than that of air from the atmosphere, the dissolved air contains 40-50% more oxygen intensifying oxidation still more. Also, gases form foam decreasing the lubrication ability and causing more oxidation, because of large interface and more oxygen content. In time, the stable foam makes and deposits viscous contaminant. The foamforming is sharply increased by the water presence (even at only 0.1%).

Dissolved gas is always present in liquids and usually does not affect their mechanical properties. However, vibration, pressure and temperature oscillations drive the gas off with foaming and make the fluid inoperative. This aggravates the start up of not operating systems subjected to jarring and vibration (e.g. in a vehicle).

Of fuel-feed systems, the air problem is particularly important in diesels, where the fuel is relatively viscous and, therefore, air tends to entrain and terminate the delivery to the combustion chambers.

Liquid contaminants are water drawn into a "breathing" tank as a vapor condensing when the temperature drops, and fuel entering from combustion chambers. The effect of water in oil is foaming, the effect of volatile fuels is similar to that of gases.

The dominant decontamination methods are continuous or periodic straining, filtering, absorption, gravitational, centrifugal, magnetic and electrostatic displacement, and evaporation in atomized state, with a full flow or bypass (5-20% flow). A periodically replaceable filter is most common, the replacement being time-consuming and expensive.

Usual parameters for filter selection are pressure drop, flow capacity, nominal micron rating and dirt capacity, the calibrating channel being less than the minimum clearance in sliding pairs (i.e. the dirt level being below the tolerance level in the most sensitive component). Often this requires fine mesh filters with large pressure drop and clogging (in some areas, such filters can become a repository for biological growth). The measure of the filter performance is a (Beta) ratio between the numbers of the same size particles upstream and downstream of the filter. In many cases, 10 micron filtration is enough balance between the cost and operating efficiency.

The importance, for example, of lubrication problems is illustrated by the following facts. For 3 years, over 40 researchers of Galf Canada Ltd. worked to achieve 15,000 mls (25,000 km) between oil changes, and the company invested $250 mln in the project (THE GLOBE AND MAIL, Toronto, Canada, May, 28, 1981). Shell Canada Ltd. invested $20 mln in lubrication oil recycling (Ibid., July 3, 1981). The present trend has been towards better oils, wearing surfaces and filters, for longer oil usage.

This author has approached the problem in a fashion 180 degrees out of phase with the prior technology, i.e. by effective conditioning and reconditioning the oil and breaking-down contaminants, instead of (or in addition to) traditional filtering (see above patents). This methods far exceeds the filter performance and allows 40,000 mls (65,000 km) between oil changes with savings in down-time, initial cost and fuel economy, amounting to billions of dollars for the U.S.A. per annum, and what is more, no capital investments are required.

The following effects are achieved:
(1) oil is maintained at its top lubricating efficiency;
(2) sludge is not formed, making filters (if in use) continuously effective;
(3) volatiles are driven off;
(4) antifrictional properties and mileage are improved by filling-in the cavities of worn and defective surfaces, smoothing and restoring the same, extending the actual contact area, increasing intersurface heat transfer, reducing intersurface pressure and microseizure;
(5) safeness and foolproofness in operation;

(6) decrease in electrostatic electricity accumulation (since metal particles increase the electroconductivity of oil), which adds the fire safety and decreases the electrostatic component of wear;

(7) oil quality is improved in response to silent electrical discharges between the metal particles;

(8) factors of acidity and alkalinity (characterizing respectively the degree of oil oxidation and undepleted additives) are improved by 20–50%;

(9) decrease in sliming, carbon and varnish depositing by 15–30%;

(10) double time between oil changes;

(11) filtration requirements are diminished;

(12) demulsification (particularly, of water-oil fluids for large marine systems, fire-resistant systems, cutting and cooling fluids, etc.) is prevented.

The fleet test was conducted by Can-Tex Industries (Texas) in four INTERNATIONAL trailer-tractors with Cummins diesels of slightly different production series. The behavior of the tested devices was compared with the conventional bypass filter (considered as a reference). Each unit was sampled as near as possible on a weekly basis, with the date and mileage recorded. The samples were analyzed by Optimal Systems Inc. (Georgia) and HLAC Instruments Division of Pacific Scientific, reported listed mileage since overhaul and oil change, viscosity and concentration of silicon, iron, aluminum and lead particles at each incremental period. A rigid running schedule was necessary to cover the frequency of engines tuning, oil sampling, examination, merit rating of easily accessible components (covers, filters, etc.), and dimensional checks. To eliminate human factors, all vehicles worked together and the drivers were interchanged periodically.

Cleanliness is a principal criterion for sticking and depositing of carbon and varnish on rings, pistons, cylinders and combustion chambers, and of sludge and varnish on covers and crankcase. To measure the total volume of the deposits on pistons, the latter are placed into a measuring cylinder with a liquid before and after tests, the difference in the liquid levels being measured.

The simplest methods of wear determination are sizing and weighing the same details before and after tests, and indenting the surfaces with a diamond tool, the indentation being also measured.

The wear can also be determined by the metal content of oil samples drawn periodically, although some particles are trapped by filters. That is why microgeometric methods are better. A profilograph including a diamond point moved on the measured surface in a magnetic field generates a weak current, which after amplifying actuates a pointer over a calibrated dial.

The radionucleonic technique allows the wear measurement without interruption of the operation. In engine industry this method is used for cams, tappets, valve guides and seats, pistons and their rings, bearings, gears, etc. The areas in question are irradiated selectively with heavy charged particles from an accelerator, the wear being determined either by the surface radioactivity loss, or by the radioactivity increase of oil or filters.

For analyzing particulate contamination, a liquid sample can be filtered through a laboratory membrane, the retained particles being sized and counted statistically with the use of microscopes or automatic particle counters. Another method employs light interception of the sample by the particles reducing the voltage of a photodetector. In still another method (sometimes referred to as ferrography), ferrous particles are pulled to a glass surface over which the oil is passed, the ferrogram resulting after oil is washed away with a solvent. Non-ferrous particles can be also attached to the ferrous ones. Finally, in a spectrometric method, the oil is burned between electrodes and the solid contaminants give off light at discrete wavelengths, the light being dispersed and quantitatively measured.

The acidity, basicity or neutrality of oil is determined with color or potentiometric indicators. In the first case, the oil is added to a solvent (e.g. toluene plus isopropyl alcohol and water, or methanol and water) and titrated with a standard base or acid solution until a color change or an end point is observed in the added indicator (phenolphthalein). If the second case, a similarly prepared liquid is placed between electrodes, the chemical activity being detected potentiometrically.

A dielectric constant is determined by a voltage between electrodes placed in the sample. Electroconductivity of thin films can be measured similarly between the tips of a micrometer.

Friction can be easily measured by motoring a non-firing engine without power-absorbing auxiliaries (pumps, compressors, generators, etc.), tribometric methods being more complicated.

It is again emphasized that the performance of the present method far exceeds that of conventional filters.

More closely, the present invention relates particularly, but not exclusively, to the simple and efficient device for breaking down contaminants existing within a liquid medium, disclosed in my cited U.S. Pat. No. 4,284,245. This device includes a nozzle, a feed inlet and a discharge outlet adapted to communicate respectively with a pressure line and a reservoir means of the medium. The known device is used mostly in a bypass manner, without in any way adversely affecting the normal operation of the system.

The principal objective of the present invention is to avoid the necessity of the conventional filters at all and to enable the device to treat the full flow.

This objective is attained by providing a filtering means removing the large contaminants. For this, between said inlet and nozzle, a collar is installed and contains inner and outer lateral surfaces and a plurality of minor openings through which the medium is filtered before entering the nozzle.

Said openings can be formed by the mutual crossing of substantially axial and annular grooves on said surfaces, the axial grooves breaking through the annular ones. The annular grooves can be formed by a thread.

Said collar can be represented by a compression coil spring.

Further distinguishing characteristics are that the collar is provided with a contaminants trap shaped as a cone tapered from the collar and placed with a gap into and upstreamly of the nozzle. The trap can have a magnetic element.

The distinguishing characteristics and objectives of the present invention set out herein are more apparent and obvious to one ordinarily skilled in the art from the following detailed description, drawings and appended claims.

In the drawings:

FIG. 1 is a longitudinal section of the present device with annular and axial grooves respectively on the inner and outer lateral surfaces of the collar;

FIG. 2 is the same as above, with annular and axial grooves respectively on the outer and inner lateral surfaces of the collar;

FIG. 3 is the same as above, with a spring.

Referring to the drawings, the device of the present invention includes a central substantially circular body 1 having a threaded intake 2 for a liquid pressure line and a nozzle 3 screwed into the threaded bore of the body 1 and having a stand-off plate 4 on its free end. The nozzle 3 has planar surfaces or other kinds of grips (not shown) for a wrench or the like and fastens a collar 5 and a contaminants trap 6 placed upstreamly of the nozzle.

The device is shown attached to the wall 7 of a reservoir means (e.g. a tank, a sump and the like) in return flow manner of the liquid treatment. Such an installation is shown by way of illustration, but not of limitation.

The collar 5 has openings formed by the mutual crossing of substantially axial (8) and annular (9) grooves respectively on its outer and inner lateral surfaces (FIG. 1), or on its inner and outer lateral surfaces (FIG. 2). The plurality of said annular grooves, preferably of a triangular section, can represent an internal (FIG. 1) or external (FIG. 2) thread. The axially extending grooves have such a depth that they break through the vertexes of the triangular annular grooves, thus creating a multitude of narrow openings forming a communication between the interior and exterior of the collar 5.

Instead of the latter, a compression coil spring 10 (FIG. 3) can be used. The interior of the spring 10 communicates with its exterior through the gaps between the turns of the spring 10. These gaps can be controlled by screwing the nozzle 3 into the body 1.

The contaminants trap 6 is shaped as a cone tapered from the collar 5, placed into the nozzle 3 with a gap and has openings 11 in its base 12 and a magnetic rod 13 in its vertex.

In operation, the liquid medium is delivered under pressure to the nozzle 3. Contaminants having dimensions exceeding the filtering openings cannot pass through. In the nozzle the liquid accelerates and impacts at high speed against the plate 4. This impact breaks-down the contaminants, the medium spraying out of the device into a tank or a sump. The atomized and heated (because of the filter and nozzle throttling) medium is simultaneously degassed because of the decreasing solubility under falling pressure in the jet, elevating temperature, increased free liquid surface and agitation bringing gases to the surface. Also, the gas release is inhibited by the vortex movement, the gas bubble gravitating into the top of the device and being purged into the upper chamber of the reservoir means.

The degassing is based on the following Henry law:

$$X = (p_t - p_v)/H,$$

wherein
X is the gas quantity,
$p_t$ and $p_v$ are total and vapor pressures respectively,
H is Henry's constant.

The lowest gas solubility is at lowest pressure and highest temperature in the device.

For minimizing turbulence and obtaining the clean coherent jet and flow, the appropriate surfaces are polished and all changes in contour are rounded off. The nozzle design, pressure level, jet velocity, volumetric flow rate, surface condition, the stand-off distance are important for steady job of the device.

Two thresholds of velocities (or pressure drops) exist: the bottom one below which destroying does not occur for most contaminants, and the upper threshold beyond which little destroying effect is gained.

Since the openings of the collar 5 of the spring 10 have a filtering function, the contaminants are captured and directed into the trap 6. Those having magnetic properties are precipitated on the magnetic rod 13. The viscous properties of the fluid cause some non-ferrous particles to adhere to the magnetically trapped particles.

While there has been described and pointed out the fundamental novel feature of the invention as applied to the preferred embodiment, it is to be understood that this description is exemplary and explanatory, but not restrictive, the invention being not limited to the specific details shown and described. Various departures, omissions, substitutions and changes may be made by the skilled in the art without departing from the scope of the invention and without sacrificing its chief advantages. Obviously, many modifications and variations of the present invention are possible in light of the above teaching. It is therefore to be understood that within the scope of the appended claims, the present invention may be practiced otherwise than as specifically described herein.

What is claimed is:

1. A device for breaking down contaminants existing within a liquid, including
   a reservoir of the liquid;
   a pressure line of the liquid;
   a nozzle having an inlet and an outlet communicating respectively with said line and reservoir;
   a stand-off obstacle facing the outlet;
   a collar installed upstream of the nozzle, the collar containing an inner lateral surface and an outer lateral surface and a plurality of minor openings trough which the liquid is filtered before entering the nozzle.

2. The device of claim 1 wherein said openings are formed by the mutual crossing of substantially axial and annular grooves on said surfaces, the axial grooves breaking through the annular ones.

3. The device of claim 2 wherein said annular grooves are formed by a thread.

4. The device of claim 2 wherein said axial and annular grooves are located on said inner and outer surfaces respectively.

5. The device of claim 2 wherein said axial and annular grooves are located on said outer and inner surfaces respectively.

6. The device of claim 2 wherein said collar is provided with a contaminant's trap shaped as a cone tapered from the collar and placed with a gap into and upstream of the nozzle.

7. The device of claim 6 wherein said trap has a magnetic element.

8. The device of claim 1 wherein said collar is represented by a compression coil spring.

* * * * *